United States Patent
Vuppuladhadium et al.

(10) Patent No.: US 9,294,194 B2
(45) Date of Patent: Mar. 22, 2016

(54) NETWORK MONITORING USING THIN FILM SPLITTERS AND AVALANCHE PHOTODIODE DETECTORS IN MULTIMODE APPLICATION

(71) Applicant: Virtual Instruments Corporation, San Jose, CA (US)

(72) Inventors: Rama Vuppuladhadium, San Jose, CA (US); Chi-Luen Wang, Pleasanton, CA (US); John Marcolina, Saratoga, CA (US); Jeff Chung, Mountain View, CA (US)

(73) Assignee: Virtual Instruments Corporation, San Jose, CA (US)

( * ) Notice: Subject to any disclaimer, the term of this patent is extended or adjusted under 35 U.S.C. 154(b) by 95 days.

(21) Appl. No.: 13/969,946

(22) Filed: Aug. 19, 2013

(65) Prior Publication Data

US 2015/0050017 A1 Feb. 19, 2015

(51) Int. Cl.
*H04B 10/2581* (2013.01)
*H04B 10/079* (2013.01)

(52) U.S. Cl.
CPC ........ *H04B 10/2581* (2013.01); *H04B 10/0795* (2013.01)

(58) Field of Classification Search
USPC ....................... 398/9–38, 140–143
See application file for complete search history.

(56) References Cited

U.S. PATENT DOCUMENTS

| | | | | |
|---|---|---|---|---|
| 5,471,334 A * | 11/1995 | Masuda et al. | | 359/337 |
| 5,513,029 A * | 4/1996 | Roberts | | 398/32 |
| 5,986,782 A * | 11/1999 | Alexander et al. | | 398/26 |
| 6,178,025 B1 * | 1/2001 | Hardcastle et al. | | 398/17 |
| 6,344,910 B1 * | 2/2002 | Cao | | 398/34 |
| 6,959,152 B2 * | 10/2005 | Fujiwara et al. | | 398/81 |
| 7,283,744 B2 * | 10/2007 | Dinu et al. | | 398/33 |
| 7,308,211 B2 * | 12/2007 | Miyazaki | | 398/208 |
| 7,460,785 B2 * | 12/2008 | Dinu et al. | | 398/33 |
| 7,643,759 B2 * | 1/2010 | Tanaka | | 398/177 |
| 7,668,459 B2 * | 2/2010 | Inui et al. | | 398/29 |
| 7,873,283 B2 * | 1/2011 | Akiyama et al. | | 398/147 |
| 7,877,016 B2 * | 1/2011 | Nagarajan | | 398/138 |
| 8,554,088 B2 * | 10/2013 | Goto | | 398/201 |
| 8,571,414 B2 * | 10/2013 | Ohtani | | 398/159 |
| 2003/0210917 A1 * | 11/2003 | Stewart et al. | | 398/209 |
| 2004/0052522 A1 * | 3/2004 | Fishteyn et al. | | 398/29 |
| 2004/0151495 A1 * | 8/2004 | Knox et al. | | 398/25 |

(Continued)

OTHER PUBLICATIONS

"Product Specification: RoHS-6 Compliant 10Gb/s 10km Single Mode Datacom SFP+ Transceiver, FTLX1471D3BCL," Finisar Corporation, Feb. 2009, pp. 1-11.

(Continued)

*Primary Examiner* — Agustin Bello
(74) *Attorney, Agent, or Firm* — Fenwick & West LLP

(57) ABSTRACT

A network monitoring system for a multimode optical data network includes a filter based splitter and an avalanche photodiode detector-based detection subsystem. The system takes a very small amount of the energy from the main data stream to use as monitoring data signal. The filter based splitter operates in a manner that is fairly uniform among modes and permits very low energy levels to be diverted for monitoring without disrupting either the main or monitor data streams for any modes.

4 Claims, 5 Drawing Sheets

(56) References Cited

U.S. PATENT DOCUMENTS

| | | | |
|---|---|---|---|
| 2004/0208525 A1* | 10/2004 | Seydnejad et al. | 398/33 |
| 2004/0223769 A1* | 11/2004 | Hoshida | 398/188 |
| 2004/0246568 A1* | 12/2004 | Onaka et al. | 359/337 |
| 2006/0219878 A1* | 10/2006 | Yano | 250/227.11 |
| 2007/0297804 A1* | 12/2007 | Honda et al. | 398/147 |
| 2009/0123149 A1* | 5/2009 | Asghari et al. | 398/25 |
| 2010/0209047 A1* | 8/2010 | Cheung et al. | 385/48 |
| 2010/0303466 A1* | 12/2010 | Chand et al. | 398/115 |
| 2011/0135301 A1* | 6/2011 | Myslinski et al. | 398/34 |
| 2015/0050017 A1* | 2/2015 | Vuppuladhadium et al. | 398/38 |

OTHER PUBLICATIONS

"SFP Optical Transceiver—OC-48 for up to 80-km Reach, OC-12 and Gigabit Ethernet for Up to 120-km Reach," JDS Uniphase Corporation, May 2011, 19 pages.
"SRX03-APD: High Sensitivity OC-3/STM-1 APD Receivers," Oplink Communications, Inc., 2008, 3 pages.
"WFSS-1512-X Series: Single-Mode 1550nm 1.25Gbps FC/GBE Duplex SFP Transceiver RoHS6 Compliant," Waterfront Solutions (WFS), Release Date Feb. 10, 2010, 17 pages.

* cited by examiner

NETWORK MONITORING USING THIN FILM SPLITTERS AND AVALANCHE PHOTODIODE DETECTORS IN MULTIMODE APPLICATION

FIELD

This disclosure is related generally to monitoring performance of data networks, and specifically to low power tap-off monitoring of multimode fiber data streams using thin film splitters and avalanche photodiode detectors.

BACKGROUND

Data networks continue to evolve with ever-higher speeds and more extensive topologies. In order to improve performance of such networks and troubleshoot problems, it is well known to monitor performance of networks through various techniques.

Conventional monitoring systems often use traffic analysis points (also known as test access points or TAPs) implemented with fused biconical tapered (FBT) devices to divert a portion of a data signal's power and send it to a monitoring device, while allowing the majority of the signal's power to continue on to its destination. However, use of conventional TAPs results in significant insertion loss, which can introduce signal degeneration and possibly data errors if the margin on the TAP side is not sufficient—exactly the opposite result intended by introduction of performance monitoring equipment.

Thus, challenges of network performance monitoring include minimizing the insertion loss that results from the monitoring equipment. Further challenges come from the fact that data networks operate in a multimode manner, adding complications of mode coupling and modal dispersion. Modal dispersion limits the bandwidth-distance of the network since different modes travel at different speeds. This not only causes a power penalty but also mode partition noise. Mode coupling in multimode fiber does not typically affect optical transmission, but with certain devices such as FBT splitters, higher order modes get lost in the fusion region of the splitter and as a result the device will be mode dependent, based on launching conditions. More generally, such characteristics result in significant insertion loss.

Conventional TAPs use transceiver subsystems based on PIN diodes (i.e., diodes having an "intrinsic" semiconductor region between the p-type region and the n-type region). These diodes have been used for decades for photodetection, but conventionally require significant numbers of photons to generate current. Thus, in typical applications, conventional monitoring solutions include TAPs that may sometimes utilize between 30 and 50% of the total power of a data signal for monitoring, essentially cutting the usable power of the data signal in half. Since, at higher transmission speeds, other significant signal strength losses already result from various network components (e.g., inherent loss in the fiber itself, in interconnects, multiplexer/demultiplexer devices, repeaters), the losses resulting from conventional monitoring solutions can impose strict limits on network capabilities.

For single mode fiber systems, other types of splitters (e.g., thin film splitters) and detectors (e.g., avalanche diode detectors) have variously been used, but such systems are not known to be applicable to multimode network systems. What is needed is a simple and inexpensive manner to obtain monitoring signals from a multimode optical network with minimal impact on the data network itself.

SUMMARY

In one embodiment, a thin film splitter is inserted in a multimode optical network path and used to provide a weak monitoring signal that is provided to an avalanche photodiode detector subsystem.

Additionally, in some aspects the network path uses an 8.5 gigabit per second (8GFC) applied signal and the splitter is configured such that the weak monitoring signal has a power of approximately 10% of the 8GFC applied signal. In other aspects, the network path uses a 14.025 gigabit per second (16GFC) applied signal and the splitter is configured such that the weak monitoring signal has a power of approximately 20% of the 16GFC applied signal.

The features and advantages described in the specification are not all inclusive, and particularly, many additional features and advantages will be apparent to one of ordinary skill in the art in view of the drawings, specification and claims herein. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

A preferred embodiment is now described with reference to the figures where like reference numbers indicate identical or functionally similar elements.

Figure 1:
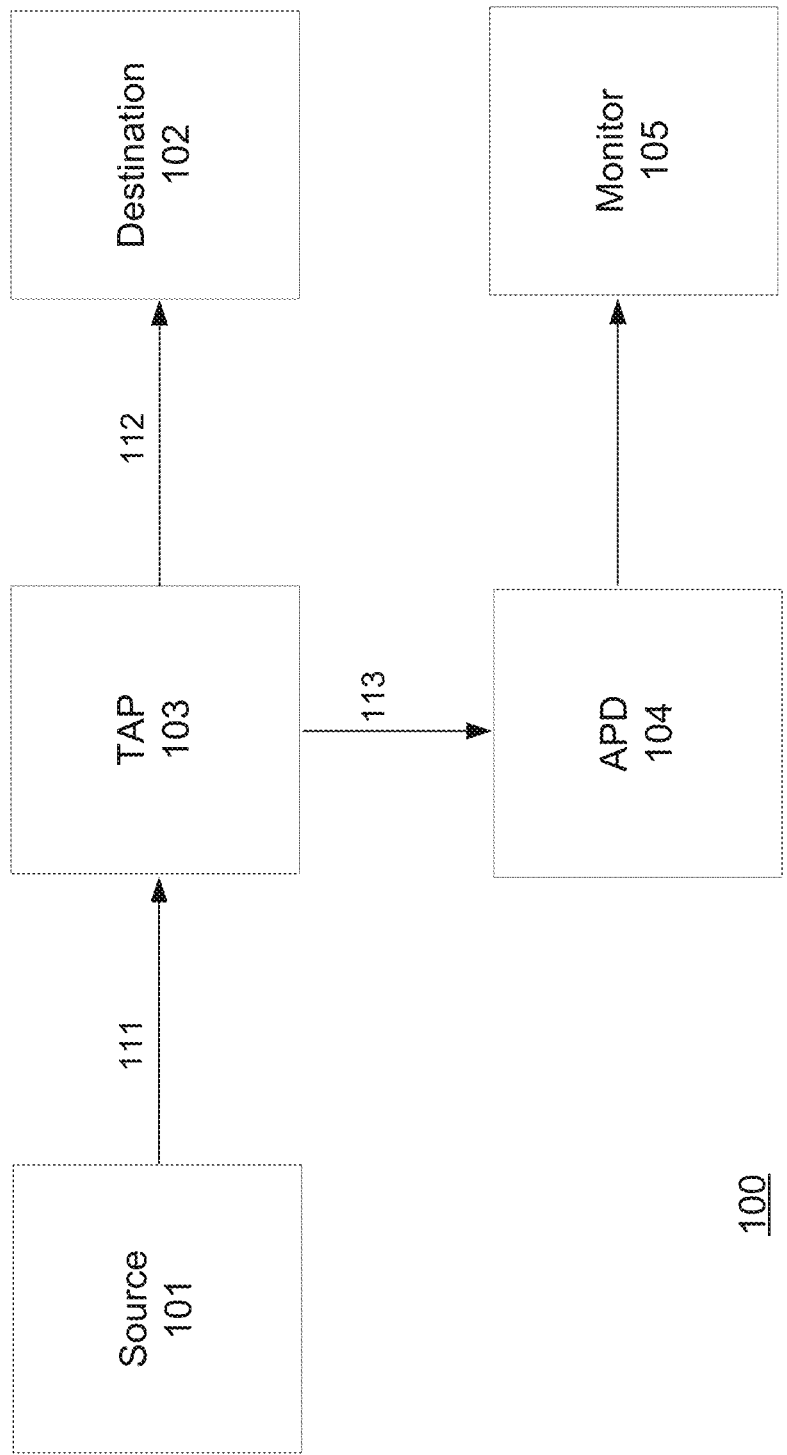
FIG. 1 is an illustration of a monitoring system according to one embodiment.

FIG. 1 is a high level diagram of a monitored network 100. The network 100 includes a source device 101 providing an applied signal (typically a multiplexed optical signal), at least a portion of which is intended to be sent to a destination device 102. In one typical embodiment, the source device 101 is a server subsystem and the destination device 102 is a storage subsystem. Monitoring is performed by inserting a TAP 103 between the source device 101 and the destination device 102. As further described below, the TAP is further connected to an APD subsystem 104 that receives a portion of the signal from the source device 101, processes the signal and provides a corresponding output to a monitoring subsystem 105. Typically, source device 101 is connected to TAP 103 via an optical fiber 111, TAP 103 is also connected to destination device 102 via an optical fiber 112, and TAP 103 is connected to APD 104 via an optical fiber 113.

In actual implementation, network 100 will consist of many additional components, typically with tens if not thousands of interconnected source devices, destination devices and TAPS, and with fibers 111 and 112 being multimode fibers capable of carrying numerous independent signals at various wavelengths in a frequency-division multiplexed manner. The components shown in FIG. 1 are thus illustrated in a simplified manner to most clearly illustrate the subject of this disclosure.

Those skilled in the art will recognize that an avalanche photodiode detector (APD) is a device known for use in applications such as deep space communications, laser range finding and long length fiber optic transmission lines, where received optical signal strengths are extremely low. APDs have some unusual characteristics, however, that have to date limited their attractiveness in other applications. As one example, APDs often operate with extremely weak signals that have correspondingly low signal to noise ratios. If those signals include clocking information, that information can easily be disrupted by noise and so that clocking information can be very difficult to process in a reliable manner. As another example, APDs typically have extreme sensitivity to the manner in which they are powered, making driving APD-based systems somewhat more complicated than conventional (PIN or photomultiplier tube) detectors.

One characteristic of FBT-based TAPs is that insertion loss with an FBT TAP is both significant and highly variable over the modes of optical signals applied to it. This impacts both the insertion loss (i.e., the signal strength on fiber 112, sometimes referred to as the "live" output of the TAP) and the monitor signal strength (i.e., the signal strength on fiber 113, coming from the monitor output of the TAP) in a manner that in some implementations leads to unacceptable bit error rates and confidence levels for both the live and monitor signals. Further, FBT implementations often have significant fiber wraps that result in a "bending" loss that, in practice, can exceed theoretical expected losses.

Figure 2:
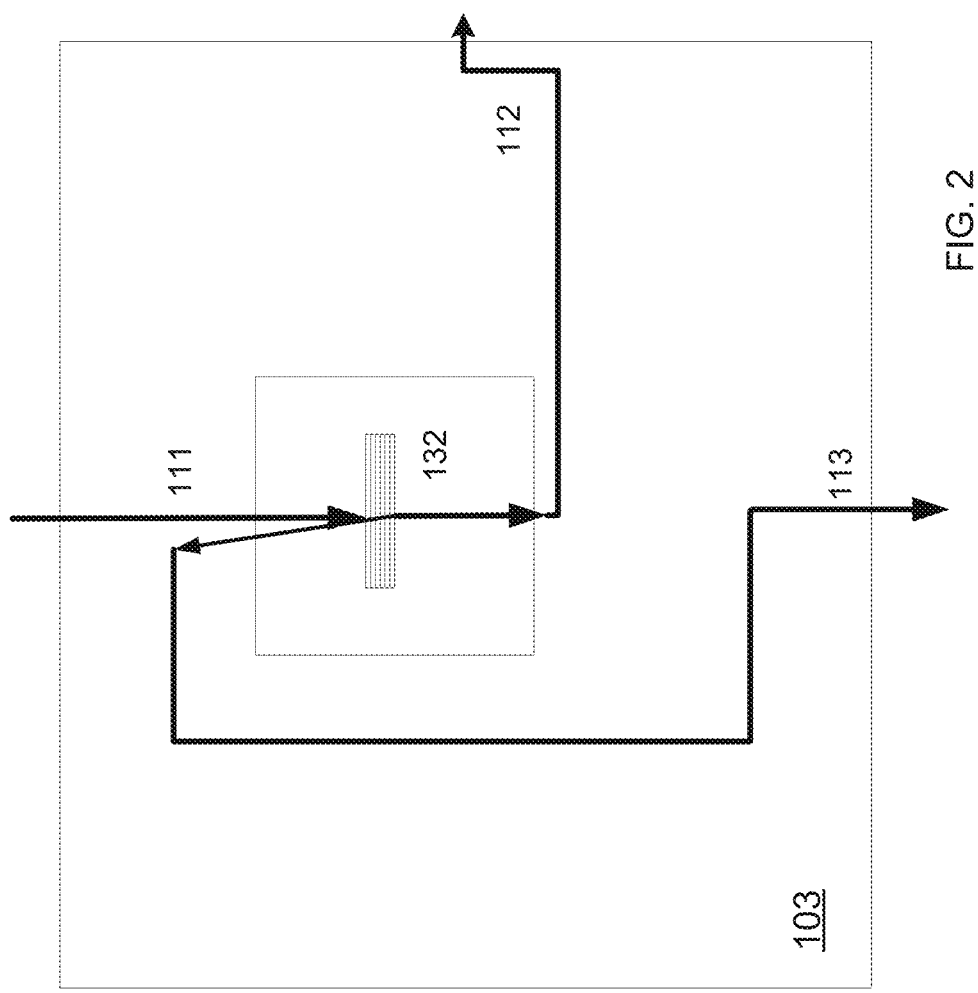
FIG. 2 is an illustration of a filter-based TAP according to the embodiment of FIG. 1.

Thin film splitters (also known as "TFSs" or, somewhat more broadly, "filter based splitters") are known for use in single mode TAP applications. They have not, however, been used in implementations for monitoring multimode networks as described herein. For multimode fibers, the dielectric multi-layer coating used in TFSs lead to certain advantageous characteristics compared to FBT-based TAPS. First, operation of such a TFS with the multi-layer dielectric coating helps ensure that the actual power ratio of the splitter closely matches the theoretical value, and is therefore both predictable and consistent among a variety of modes, and in particular handle higher-order modes much more cleanly than FBTs (i.e., the dielectric multilayer coating reflects a desired portion of incoming light as monitoring light and transmits the remaining light to the "live" side). With a multimode system operating at 850 nm, use of TFS rather than FBT allows somewhat lower signal power to be reflected to the monitoring side (thus reserving more power for the "live" side), a factor that becomes particularly important at higher data speeds, e.g., 10G Ethernet and 16GFC. Referring now also to FIG. 2, in a preferred embodiment, TAP 103 includes a 50 micron multimode TFS 132 configured to send only a very low power multimode monitoring signal (e.g., 10% at 8 gigabit/second data speeds and 20% at 16 gigabit/second data speeds) on fiber 113.

In addition to starting with a very low power multimode signal, the fibers in a network are often of a sufficient length (e.g., the length of fibers 112 and 113) and configuration that significant additional losses are incurred and it therefore remains a challenge to provide enough signal power on both the operational or "live" side and the monitoring side of the TAP to result in acceptable bit error rates and confidence levels. Conventionally, for a monitoring system as shown and described with respect to FIG. 1, there have not been any detectors available that are able to provide a usable multimode monitoring signal, lower than −11 dBm. Commercially available PIN-based detectors have receiver sensitivity on the order of −10 to −11 dBm (stressed), which is insufficient for use at the low signal strengths desired here. Those skilled in the art will recognize that "stressed" in these figures indicates use of a test signal that has random, deterministic and sinusoidal jitter as set forth in standards on which fiber channel specifications are based.

Known APD-based detector systems are, like most APD applications, intended only for single mode detection. For example, conventional APDs usable for network monitoring are top-illuminated with an optical aperture of 30-50 microns. They are optimized for single mode only, at wavelengths of 1330 nm and 1550 nm. Thus, these devices are not usable for detection of multiple modes.

Figure 3:
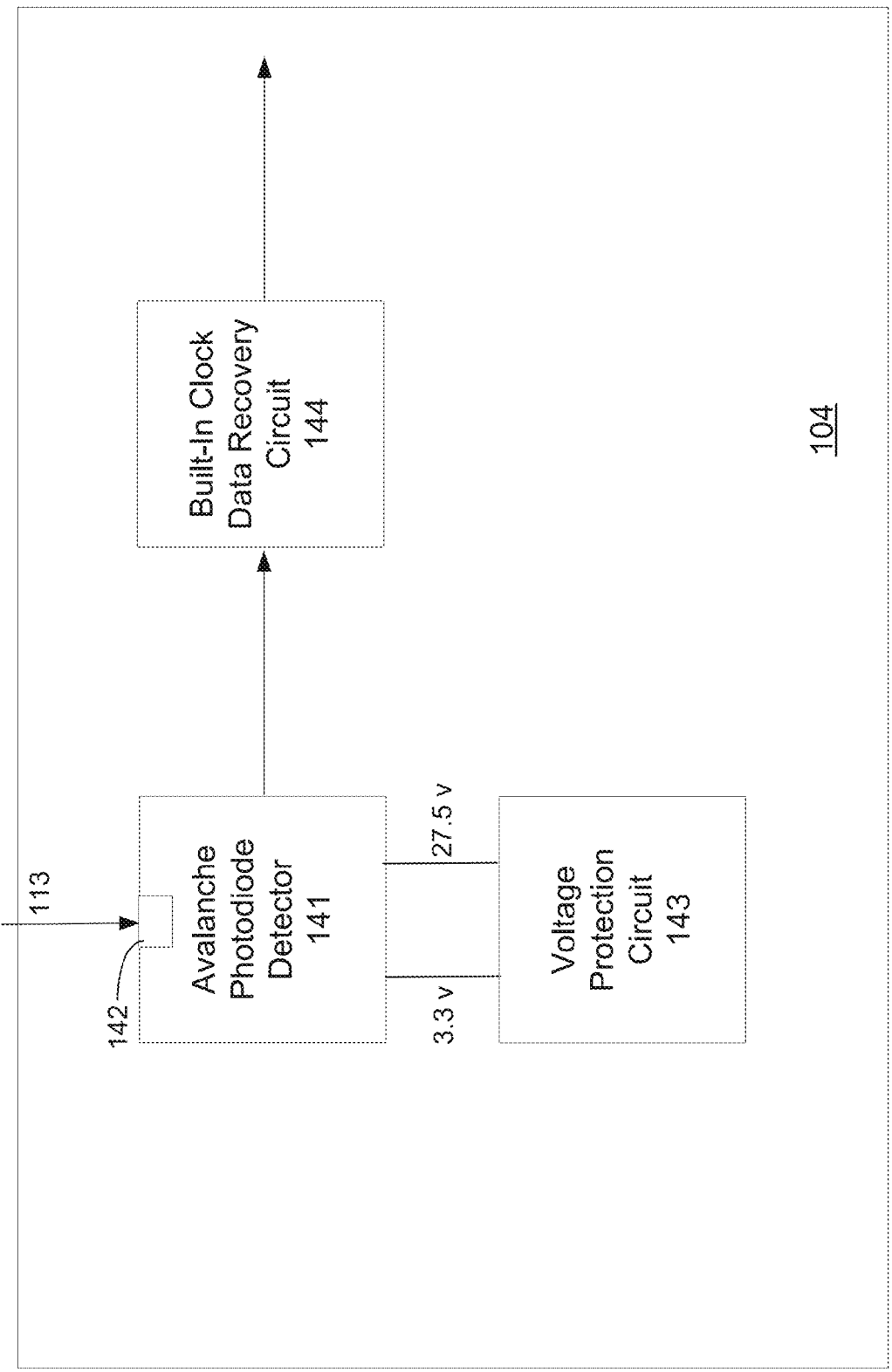
FIG. 3 is an illustration of an APD detector subsystem according to the embodiment of FIG. 1.

Accordingly, APD subsystem 104 employs a different type of APD. Referring now also to FIG. 3, in a preferred embodiment, APD subsystem 104 uses an avalance photodiode detector (APD) 141 that is still top-illuminated, but has an aperture 142 an order of magnitude larger than the APDs used for single mode operation, is used. Typically, aperture size of the single mode APD is in the range of 30-50 microns. Specifically, in a preferred embodiment APD 141 has an aperture 142 of an order of magnitude larger than single mode APDs, and is optimized for multimode operation at 850 nm. Typical APDs are designed for maximum possible sensitivity (as low as −32 dBm when operating at a bias of −29 volts), but in this case priority is given to the ability to handle multiple modes, so some loss in sensitivity is accepted. In this embodiment, it is found that adjusting operational characteristics to allow multi mode operation, with some acceptance of mode split noise, still provides usable sensitivity of approximately −20 to −22 dBm with a bit error rate of 1E-12 at 8 gigabits per second operating at a bias of −27.5 volts. This is found to provide commercially acceptable results even with the low monitoring power levels discussed above. In various embodiments, APD subsystem 104 employs an APD 141 with sensitivity better than −19.5 dBm (stressed) for 8.5 gigabit per second data rates and better than −16 dBm (stressed) for 14.025 gigabit per second data rates, with corresponding bit error rates on the order of 1E-12.

Combining a TFS-based TAP 103 with the multimode APD subsystem 104 as described above is found to yield a network 100 with monitoring capabilities that meet all applicable standards for commercial data networks, including IEC61280 and IEEE802.3.

Figure 4:
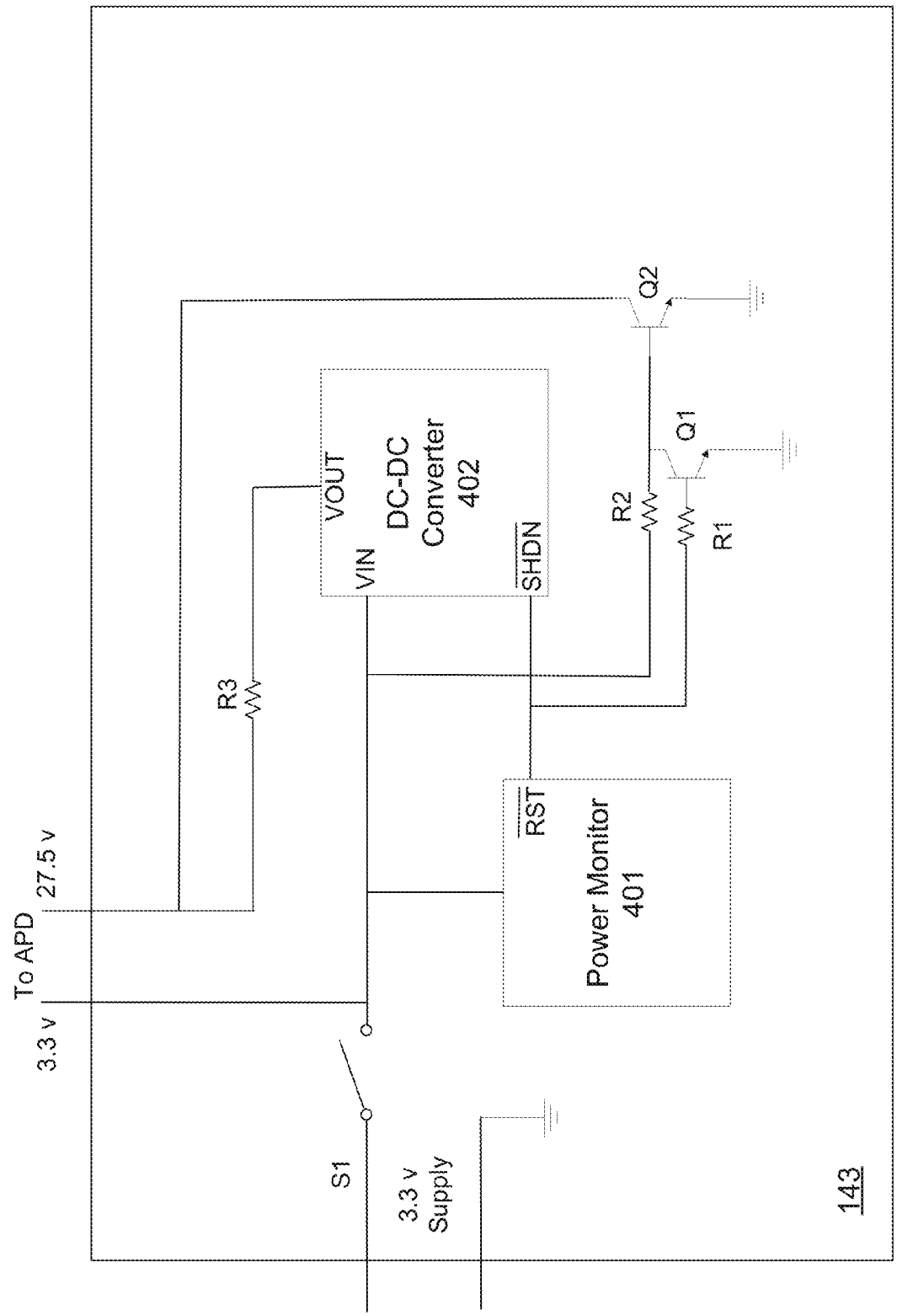
FIG. 4 is a block diagram of a voltage protection circuit for the APD subsystem shown in FIG. 1.

Referring now to FIG. 4, as mentioned above APD-based detectors are found to be quite sensitive to timing of the application of operating voltages. In one implementation, dual low voltage and high voltage inputs are required for operation, and application of the high voltage before application of the low voltage is found to cause circuit failure. Therefore, voltage protection circuit 143 is used to ensure that high voltage is applied only after low voltage is applied, and likewise high voltage is disconnected from the APD subsystem before low voltage is disconnected.

Specifically, and referring now additionally to FIG. 4, voltage protection circuit 143 includes a switch S1, a low voltage threshold power monitor 401, a DC-DC convertor 402 to step up low voltage to high voltage, and crowbar transistors Q1 and Q2, as well as corresponding resistors R1-R3. In operation, when switch S1 is closed, low input voltage (in a preferred embodiment 3.3 volts) is applied to DC-DC converter 403, which is used in a preferred embodiment to provide high voltage of 27.5 volts to APD subsystem 104. Power monitor circuit 401 holds a reset pin of DC-DC converter 402 at reset state until the applied low voltage passes a threshold level (in one embodiment, 3.1 volts). Once that threshold is passed, the reset state of the DC-DC converter 402 is removed and high voltage is provided to APD subsystem 104. Once power is removed (e.g., switch S1 is opened), the input voltage begins to decay; when the threshold is again passed the reset state is again asserted, which drives transistors Q1 and Q2 to quickly clamp input and output of DC-DC converter 402 to zero volts, thus ensuring that the high voltage input to APD subsystem 104 is not permitted to persist longer than the low voltage input. Those of skill in the art will recognize other techniques to provide similar voltage protection for the APD subsystem 104.

Figure 5A:
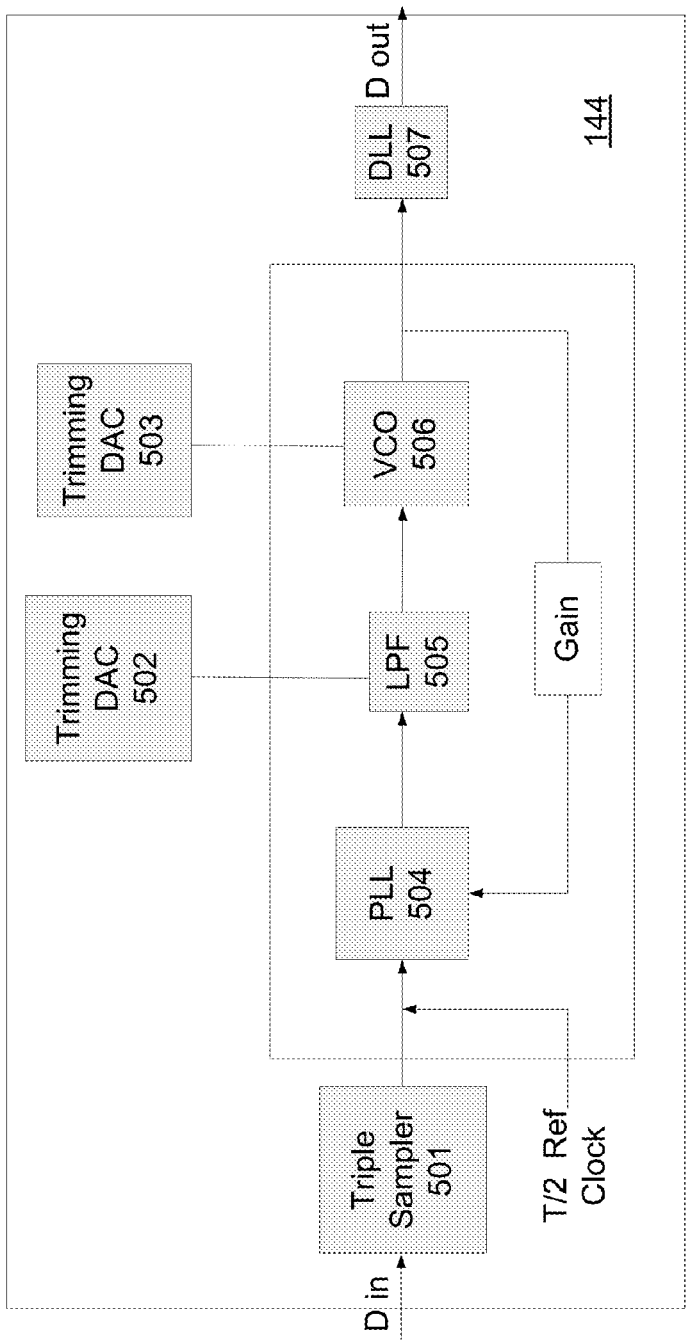
FIG. 5A is a block diagram of a clock/data recovery circuit for the APD subsystem shown in FIG. 1.
Figure 5B:
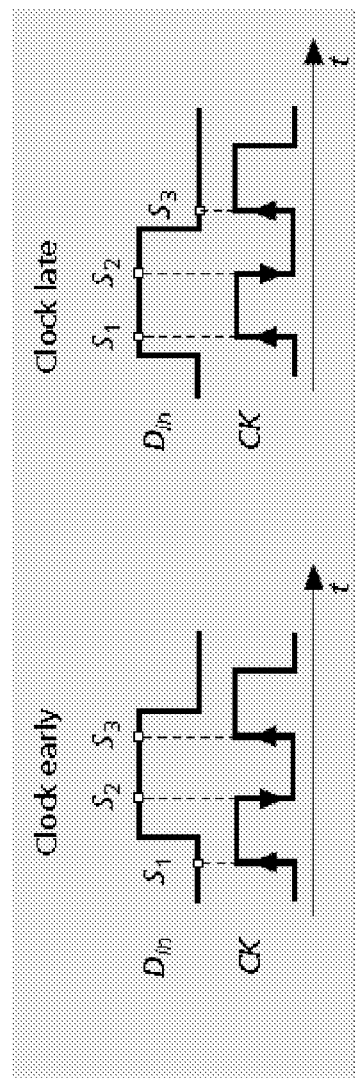
FIG. 5B is a timing diagram relating to the clock/data recovery circuit shown in FIG. 5A.

At extremely low monitoring signal levels, clocking signals that are supposed to be provided in a highly regular manner may be corrupted by noise. Thus, in one embodiment the avalanche photodiode detector subsystem 104 includes a built-in clock data recovery (CDR) retime, or clock data recovery circuit 144, configured to regenerate a clock signal imperfectly detected in the weak monitoring signal. Referring now to FIG. 5A, in one embodiment, a combination of a phase locked loop (PLL) and delay locked loop (DLL) circuit is used to effectively recover such a weak clock and data signal. Referring now to FIG. 5A, in this embodiment a triple sampler 501 receives the input signal $D_{in}$ and samples it at every expected clock transition. A half speed nominal reference clock signal is mixed with the output of the sampler. Referring now as well to FIG. 5B, these samples can help determine whether the reference clock is early ($S_1$ low, $S_2$ and $S_3$ high) or ($S_1$ and $S_2$ high, $S_3$ low) late with respect to the received clock signal. A phase-locked loop module is formed of a PLL phase/frequency detector circuit 504 with associated low pass filter 505 and voltage controlled oscillator 506 in a variable-gain feedback loop and corresponding trimming digital to analog converters 502 and 503. The PLL phase/frequency detector circuit 504 serves as an error amplifier to minimize phase difference, $\Delta\phi$, between data and reference clock. Thus phase loop is considered locked if $\Delta\phi$ is constant with time, a result of which is, input and output phase are equal. Similarly in the case of frequency, loop is locked if $\Delta\omega$ is constant with time, i.e., input and output frequencies are equal. The two trimming DACs 502 and 503 simultaneously bring the VCO center frequency and PLL closed loop bandwidth to their specified values.

Further transmitted or retrieve data often suffers from timing jitter. In order to lower the jitter noise, the data can be regenerated or retimed with the help of phase locked clock recovery circuit 144. Thus in the presence of reference clock, PLL is used along with the edge detection to perform clock data recovery. Finally an additional DLL 507, or in some embodiments a delay line, is used to optimize the quadrature point of the transition and to align it, such that it helps in the eye opening and meeting the eye mask margin requirement as stated in the corresponding fiber channel specification.

It is appreciated that the particular embodiment depicted in the figures represents but one choice of implementation. Other choices would be clear and equally feasible to those of skill in the art.

While the disclosure herein has been particularly shown and described with reference to a preferred embodiment and various alternate embodiments, it will be understood by persons skilled in the relevant art that various changes in form and details can be made therein without departing from the spirit and scope of the disclosure.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for multimode TAP using TFS and APD through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A network monitoring system, comprising:
   a source device providing an optical multimode data stream to be sent to a destination device;
   a traffic analysis point operatively connected to the source device and the destination device, the traffic analysis point receiving the optical multimode data stream via a first multimode fiber and using a filter-based splitter to divide the optical multimode-data stream into a first portion having a first power level and a second portion having a second power level, the traffic analysis point configured to send the first portion to the destination device via a second multimode fiber;
   a detector subsystem operatively connected to the traffic analysis point, the detector subsystem including an avalanche photodiode detector and being configured to receive from the traffic analysis point the second portion of the optical multimode data stream via a third multimode fiber and to generate therefrom a multimode monitoring signal, the detector subsystem further operatively connected to the monitoring device and configured to provide the monitoring device with the multimode monitoring signal; and
   a monitoring device operatively connected to the detector subsystem and configured to monitor network performance based on the multimode monitoring signal.

2. The network monitoring system of claim 1, wherein the optical multimode data stream includes a mode providing data at a rate of approximately 8.5 gigabits per second, wherein the first power level with respect to the mode is approximately nine times greater than the second power level with respect to the mode.

3. The network monitoring system of claim 1, wherein the optical multimode data stream includes a mode providing data at a rate of approximately 14 gigabits per second, wherein the first power level with respect to the mode is approximately four times greater than the second power level with respect to the mode.

4. The network monitoring system of claim 1, wherein the filter-based splitter is a thin film splitter (TFS).

* * * * *